(12) United States Patent
Lee

(10) Patent No.: US 10,138,992 B2
(45) Date of Patent: Nov. 27, 2018

(54) DAMPER PULLEY ASSEMBLY FOR VEHICLE

(71) Applicants: Hyundai Motor Company, Seoul (KR); Kia Motors Corporation, Seoul (KR)

(72) Inventor: Jae Kwon Lee, Suwon, Gyeonggo-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 259 days.

(21) Appl. No.: 15/239,436

(22) Filed: Aug. 17, 2016

(65) Prior Publication Data

US 2017/0138458 A1    May 18, 2017

(30) Foreign Application Priority Data

Nov. 13, 2015    (KR) ........................ 10-2015-0159963

(51) Int. Cl.
  *F16H 55/30*    (2006.01)
  *F16H 55/36*    (2006.01)
  *F02B 67/06*    (2006.01)

(52) U.S. Cl.
  CPC ............. *F16H 55/36* (2013.01); *F02B 67/06* (2013.01); *F16H 2055/366* (2013.01)

(58) Field of Classification Search
  CPC .. F16H 55/36; F16H 2055/366; F16F 15/126; F16F 15/14; F16F 15/1442
  USPC .................................................. 474/166, 152
  See application file for complete search history.

(56) References Cited

U.S. PATENT DOCUMENTS

| 4,794,816 A | * | 1/1989 | Serizawa | F16F 15/126 |
| | | | | 474/166 |
| 6,250,276 B1 | * | 6/2001 | Boll | F16H 3/54 |
| | | | | 123/198 R |
| 7,758,465 B2 | * | 7/2010 | Serkh | F16F 15/1442 |
| | | | | 475/318 |
| 9,182,007 B2 | * | 11/2015 | Lee | F16F 15/14 |
| 2002/0129675 A1 | * | 9/2002 | Watanabe | F16F 15/1203 |
| | | | | 74/574.4 |

(Continued)

FOREIGN PATENT DOCUMENTS

| CN | 201273357 Y | 7/2009 |
| CN | 201588919 U | 9/2010 |

(Continued)

*Primary Examiner* — Henry Y Liu
(74) *Attorney, Agent, or Firm* — Mintz Levin Cohn Ferris Glovsky and Popeo, P.C.; Peter F. Corless

(57) ABSTRACT

A damper pulley assembly for a vehicle is provided and includes a crank shaft of an engine of the vehicle, a hub that is coupled to the crank shaft and configured to be rotated, a pulley that is coupled to an exterior surface of the hub and configured to be integrally rotated with the hub and an oil seal that is disposed between the hub and an interior of a cylinder block configured to prevent engine oil leakage in the cylinder block. The hub has an abrasion prevention component formed on an exterior circumference surface on which the oil seal is disposed, and the abrasion prevention component prevents separation of the oil seal. Thus, a friction coefficient of a portion where a contact with the oil seal is concentrated is reduced and abrasion of a shaft is reduced by applying an anti-abrasion coating to improve hardness.

15 Claims, 6 Drawing Sheets

(56) References Cited

U.S. PATENT DOCUMENTS

2014/0117627 A1* 5/2014 Franke .................... F16J 15/26
                                                            277/500
2015/0072818 A1* 3/2015 Lee ........................ F16F 15/14
                                                            474/166

FOREIGN PATENT DOCUMENTS

| CN | 202646528 U     | 1/2013  |
| JP | 2014-514517 A   | 6/2014  |
| KR | 10-2002-0073269 A | 9/2002 |
| KR | 2006-0071805 A  | 6/2006  |
| KR | 10-2008-0092833 A | 10/2008 |
| KR | 10-1490948 B1   | 2/2015  |

* cited by examiner

DAMPER PULLEY ASSEMBLY FOR VEHICLE

CROSS-REFERENCE TO RELATED APPLICATION

This application is based on and claims the benefit of priority to Korean Patent Application No. 10-2015-0159963, filed on Nov. 13, 2015 in the Korean Intellectual Property Office, the disclosure of which is incorporated herein in its entirety by reference.

BACKGROUND

Technical Field

The present disclosure relates to a damper pulley assembly for a vehicle, and more particularly, to a damper pulley assembly for a vehicle that reduces abrasion between a hub and an oil seal.

Description of Related Art

Recently, efforts to reduce noise vibration harshness (NVH) of the vehicle are being actively conducted. In particular, a damper pulley (e.g., "isolation damper pulley") is capable of improving a lifespan of an auxiliary machinery belt by reducing torsional vibration of an engine crank shaft and reducing a variation rate of angular velocity transferred to a pulley using a damping rubber. For example, the damper pulley is divided into a damper component, a pulley component, and a hub. The damper component and the pulley component are coupled to the hub. The hub includes an oil seal to prevent oil from leaking from a cylinder block and the oil seal and the hub are rotated together. In other words, the pulley component and the hub are formed of a high stiffness material and coupled with other components, and are generally formed of cast iron (FC25). Recently, to reduce weight of the damper pulley, the cast iron hub has been replaced with an aluminum hub.

The above information disclosed in this section is intended merely to aid in the understanding of the background of the invention and therefore it may contain information that does not form the prior art that is already known in this country to a person of ordinary skill in the art.

SUMMARY

An aspect of the present disclosure provides a damper pulley assembly for a vehicle capable of preventing a leak of oil and reducing the weight of a rotational component by minimizing abrasion due to a friction that may occur between a hub boss and an oil seal. However, objects of the present disclosure are not limited to the objects described above, and other objects that are not described above may be clearly understood by those skilled in the art from the following description.

According to an exemplary embodiment of the present disclosure, a damper pulley assembly for a vehicle may include a crank shaft of an engine of the vehicle, a hub coupled to the crank shaft and configured to be rotated, a pulley coupled to an exterior surface of the hub and configured to be rotated integrally with the hub and an oil seal disposed between the hub and an interior of a cylinder block and configured to prevent engine oil from being leaked within the cylinder block. The hub may have an abrasion prevention component formed on an exterior circumference surface with the oil seal disposed thereon, and the abrasion prevention component may be configured to prevent a separation of the oil seal. The hub may include a hub body having a perforated center with the crank shaft insertedly coupled thereto. A hub ring may be protrudedly formed on an exterior surface of the hub body, and the abrasion prevention component may be formed within the hub body.

In some exemplary embodiments, the oil seal may be disposed between the hub body and the interior of the cylinder block. The pulley may be coupled to an exterior surface of the hub ring. The abrasion prevention component may include a coating component formed by performing an anti-abrasion coating for an exterior circumference surface of the hub body. The abrasion prevention component may have a depression formed in the exterior circumference surface of the hub body, and the coating component may be formed on the depression. The abrasion prevention component may be formed to be greater in size than a contact surface that the oil seal is in contact with the abrasion prevention component.

The coating component may be formed by an arc using a thermal spray, a plasma spray, or a laser cladding. The depression may have grooves that may be configured to prevent the coating component from being separated in a shaft direction of the hub body. A plurality of grooves may be formed within the depression. The grooves may be formed at a front and back of the depression in the shaft direction of the hub body. The depression size may be formed to be less than an exterior diameter of the hub body. Further, the size of coating component may be formed to be greater than the exterior diameter of the hub body. The coating component may be ground or lapped to be about equal to an exterior diameter of the exterior circumference surface of the hub body. The hub may be formed of an aluminum or magnesium alloy material.

BRIEF DESCRIPTION OF THE DRAWINGS

The above and other objects, features and advantages of the present disclosure will be more apparent from the following detailed description when taken in conjunction with the accompanying drawings.

DETAILED DESCRIPTION

Figure 1:
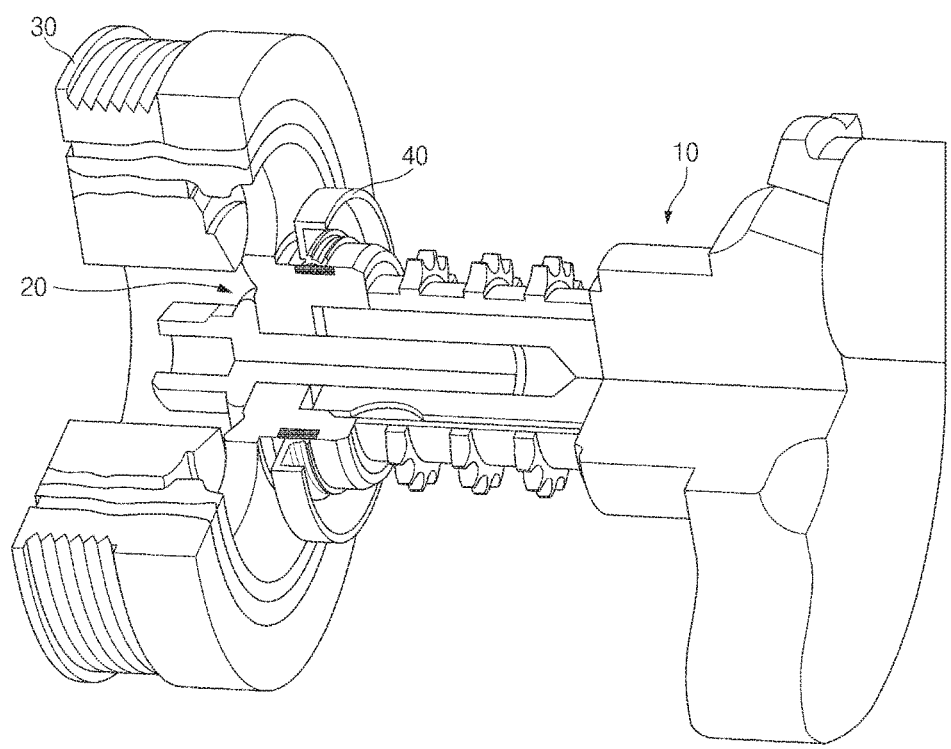
FIGS. 1 and 2 are exemplary perspective views of a portion of a damper pulley assembly for a vehicle according to an exemplary embodiment of the present disclosure.

Advantages and features of the present disclosure and methods to achieve them will be elucidated from exemplary embodiments described below in detail with reference to the accompanying drawings. However, the present disclosure is not limited to exemplary embodiments disclosed below, but will be implemented in various forms. The exemplary embodiments of the present disclosure make disclosure of the present disclosure thorough and are provided so that those skilled in the art can easily understand the scope of the present disclosure. Therefore, the present disclosure will be defined by the scope of the appended claims. Like reference numerals throughout the specification denote like elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Figure 2:
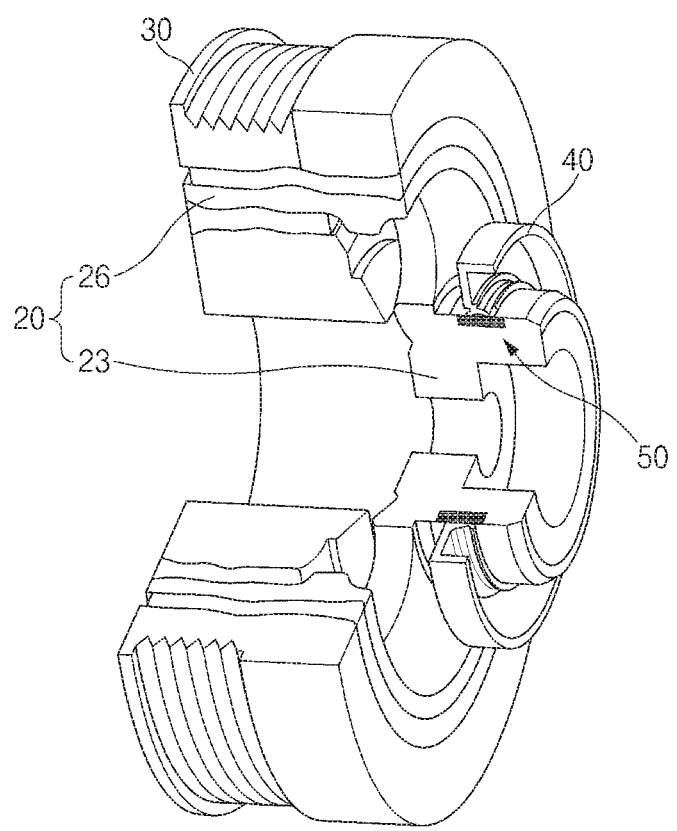
Figure 3:
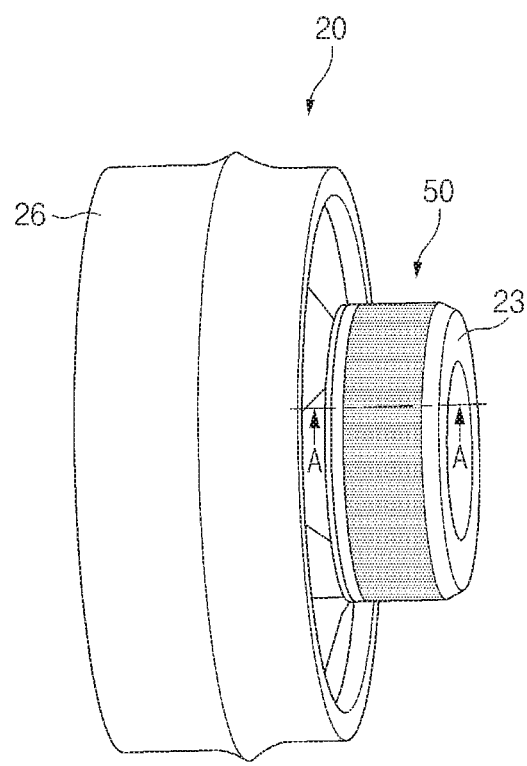
FIG. 3 is an exemplary perspective view illustrating a damper pulley according to an exemplary embodiment of the present disclosure.
Figure 4:
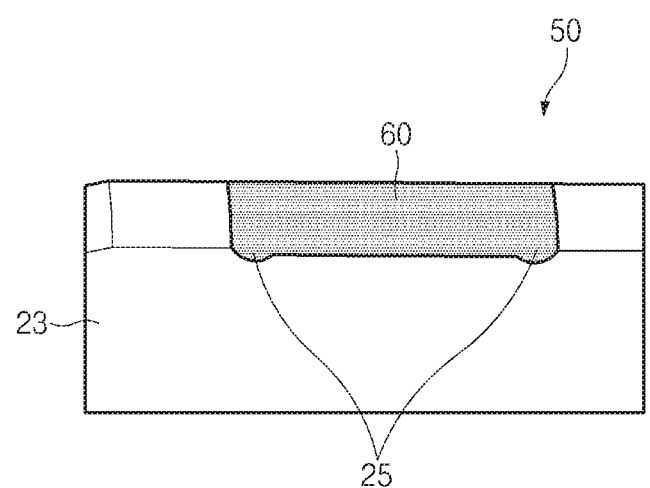
FIG. 4 is an exemplary cross-sectional view taken along the line A-A of FIG. 3 according to an exemplary embodiment of the present disclosure.

Hereinafter, the present disclosure will be described with reference to the accompanying drawings for describing a damper pulley assembly for a vehicle according to exemplary embodiments of the present disclosure. FIGS. 1 and 2 are exemplary perspective views of a portion of a damper pulley assembly for a vehicle according to an exemplary embodiment of the present disclosure. FIG. 3 is an exemplary perspective view illustrating a damper pulley according to an exemplary embodiment of the present invention. FIG. 4 is an exemplary cross-sectional view taken along the line A-A of FIG. 3, and FIGS. 5A to 5C are exemplary views illustrating a coating operation of FIG. 4 according to an exemplary embodiment of the present invention.

A damper pulley assembly for a vehicle may be modified by those skilled in the art, and the present exemplary embodiment corresponds to a damper pulley assembly for a vehicle. FIGS. 1 and 2 are exemplary perspective views of a portion of a damper pulley assembly for a vehicle according to the present disclosure. The damper pulley assembly for a vehicle according to the present disclosure will be described with reference to FIGS. 1 and 2. The damper pulley assembly for a vehicle may include a crank shaft 10 configured to receive power generated from the rotation of an interior of an, a hub 20 that includes a hub body 23 having a perforated center with the crank shaft 10 insertedly coupled thereto, and a hub ring 26 protrudedly formed on an exterior surface of the hub body 23. Further a pulley 30 may be coupled to an exterior surface of the hub ring 26 and an oil seal 40 may be disposed between the hub body 23 and an interior of a cylinder block (not illustrated) and may be configured to prevent a leak of engine oil within the cylinder block.

Further, the damper pulley assembly for a vehicle may include a damper 35 configured to absorb shock by rotation of the hub 20 between the hub ring 26 and the pulley 30. An abrasion prevention component 60 may be configured to prevent a separation of the oil seal 40 from the hub 20. The hub 20 may be rotatably coupled to the crank shaft 10. Additionally, the damper 35 may be disposed between the hub 20 and the pulley 30. The damper 35 may be configured to absorb shock generated upon a change of the rotation speed of the hub 20, when the hub 20 is integrally rotated with the crank shaft 10. The oil seal 40 may be disposed on the hub 20 to cover a portion of the abrasion prevention component 50.

FIG. 3 is an exemplary perspective view illustrating a damper pulley and FIG. 4 is an exemplary cross-sectional view taken along the line A-A of FIG. 3. The damper pulley assembly for a vehicle according to the present disclosure will be described with reference to FIGS. 3 and 4. The hub 20 may include the hub body 23 having the perforated center, and the hub ring 26 protrudedly formed on the exterior surface of the hub body 23. The hub 20 may include the abrasion prevention component 50 formed on an exterior circumference surface of the hub body 23 with the oil seal 40 disposed thereon. In particular, the abrasion prevention component 50 may be configured to prevent the separation of the oil seal 40 as shown in FIG. 2. The hub 20 may include the hub body 23 having the perforated center, and the hub ring 26 protrudedly formed on the exterior surface of the hub body 23. The hub 20 may be formed of an aluminum or magnesium alloy material.

Figure 5A:
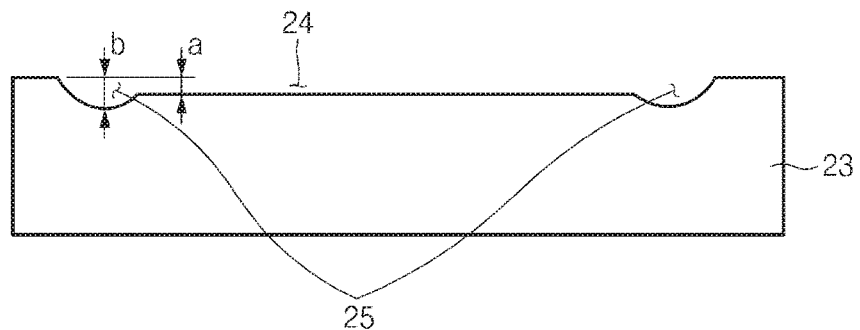
FIGS. 5A to 5C are exemplary views illustrating a coating operation of FIG. 4 according to an exemplary embodiment of the present disclosure.
Figure 5B:
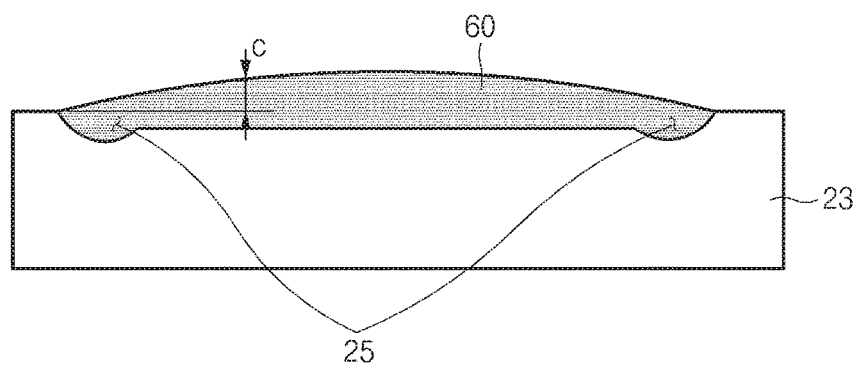
Figure 5C:
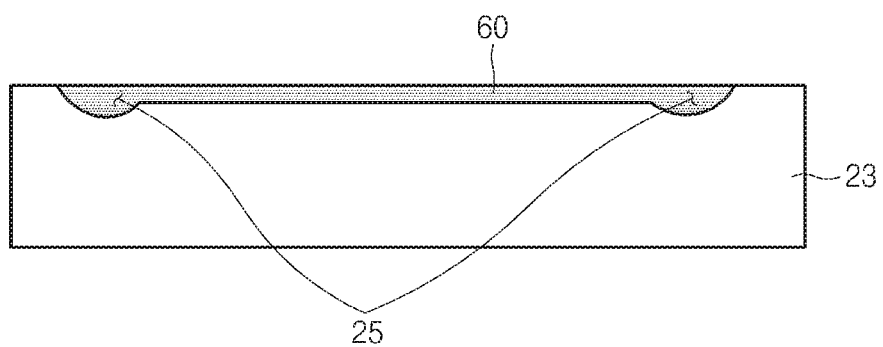

A depression 24 may be formed on the exterior circumference surface of the hub body 23. Grooves 25 may be formed within the depression 24 and may be configured to prevent the separation of hub body 23 in a shaft direction. Referring to FIGS. 5A-5C, the depression 24 may be less than an exterior diameter (a) of the hub body 23. Therefore, the depression 24 may be formed to have a predetermined depth (b) between the exterior diameter of the hub body 23 and the depression 24. The depression 24 may have the grooves 25 formed at a plurality of sides of the depression 24 and may be configured to prevent the separation of the abrasion prevention component 50. For example, a distance from the exterior diameter (a) of the depression 24 to the predetermined depth (b) at which the groove is formed may be in the range of about 0.2 to 0.25 mm. Further, a distance from the exterior diameter (a) of the depression 24 to the groove 25 may be in the range of about 0.25 to 0.3 mm.

A plurality of grooves 25 may be formed in the depression 24. The grooves 25 may be disposed at a front and back of the depression 24 in the shaft direction of the hub body 23. In other words, as illustrated in FIG. 4, the grooves 25 may be formed at points which are crossed with each other at left and right of the hub body 23. The pulley 30 may include a plurality of belt grooves (not illustrated) coupled to the exterior surface of the hub ring 26. When a belt is coupled to the belt groove, rotatory power of the crank shaft 10 (FIG. 2) may be transferred to an auxiliary machinery such as a generator, a steering pump, or an air compressor. Since the belt groove is a generally known technology, a description thereof will be omitted.

Referring to FIGS. 1 and 2, the pulley 30 may include a predetermined amount of inertial mass. The pulley 30 may be configured to absorb vibration generated by rotation of the crank shaft 10 through the inertial mass. The pulley 30 may be coupled to the exterior surface of the hub 20 and may be integrally rotated with the hub 20. The pulley 30 may be coupled to the exterior surface of the hub ring 26. The damper 35 may be configured to absorb the shock via the rotation of the hub 20 disposed between the hub ring 26 and the pulley 30. The damper 35 may be configured to absorb the shock generated while the rotation speed of the hub 20 changes, when the hub 20 is integrally rotated with the crank shaft 10. The damper 35 may be formed of a rubber member of an elastic material, and the like.

Moreover, the oil seal 40 may be disposed between the hub 20 and an interior of a cylinder block configured to maintain an airtight seal between the hub 20 and the cylinder block, to prevent engine oil within the interior of the cylinder block from leaking to the exterior of the cylinder block. The oil seal 40 may be disposed on the exterior surface of the hub body 23. The oil seal 40 may be positioned to be in contact with the abrasion prevention component 50 to cover a portion of the abrasion prevention component 50 formed on the exterior surface of the hub body 23. Accordingly, the oil seal 40 may prevent a slip by the abrasion prevention component 50.

Referring to FIGS. 3 and 4, the abrasion prevention component 50 may include a coating component 60 formed by performing an anti-abrasion coating on the exterior circumference surface of the hub body 23. According to an exemplary embodiment of the present disclosure, the abrasion prevention component 50 may include the coating component 60 formed in the depression 24 of the hub body 23. In particular, the abrasion prevention component 50 may have an area formed to be greater than a coupling surface of the oil seal 40, thereby making it possible to prevent the separation of the oil seal 40.

Referring to FIGS. 5A to 5C, the coating component 60 may be formed by an arc using a thermal spray, a plasma spray, or a laser cladding. Referring to FIG. 5B, the coating component 60 may be shaped to protrude (c) from the exterior diameter of the hub body 23 in the depression 24. The coating component 60 may be shaped to protrude about 0.05 to 0.1 mm. The coating component 60 may be ground or lapped to be substantially equal to the exterior diameter of the exterior circumference surface of the hub body 23. Accordingly, the coating component 60 may be substantially equal to the exterior diameter of the hub body 23. In other words, a thickness of the coating component 60 may be formed within about 0.2 mm. The coating component 60 may be formed in the depression 24 and the grooves 25 to prevent separation in the shaft direction of the hub 20 by the rotation and vibration of the hub 20.

An operation of the damper pulley assembly for a vehicle according to an exemplary embodiment of the present disclosure having the configuration as described above will be described. FIGS. 1 and 2 are exemplary perspective views of a portion of a damper pulley assembly for a vehicle according to the present disclosure. FIG. 4 is an exemplary cross-sectional view taken along the line A-A of FIG. 3, and FIGS. 5A to 5C are exemplary views illustrating a coating operation of FIG. 4. The damper pulley assembly for a vehicle according to the present disclosure will be described with reference to FIGS. 1, 2, 4, and 5A-5C. The depression 24 may be shaped in the hub body 23, and the grooves 25 may be shaped at a plurality of sides of the depression 24. Thereafter, the abrasion prevention component 50 may be formed by performing an anti-abrasion coating on the depression 24 and the grooves 25. The oil seal 40 may be inserted into the hub body 23 and may disposed to be seated on the abrasion prevention component 50. Next, the damper 35 and the pulley 30 may be inserted into the hub ring 26, and the shaft of the hub 20 may be inserted into the crank shaft 10 to be coupled to the crank shaft 10.

Accordingly, when the abrasion prevention component 50 is formed in the hub body 23, the oil seal 40 may be disposed to reduce a friction coefficient of a portion in contact with the hub the oil seal and friction abrasion between the oil seal and the hub may be prevented. In particular, a leak of oil may be prevented and the weight of the rotational component may be reduced.

In the damper pulley assembly for a vehicle according to an exemplary embodiment, the configuration and the method of the above-mentioned exemplary embodiments are not restrictively applied. In other words, all or some of the respective exemplary embodiments may be selectively combined with each other so that they may be variously modified. As described above, according to the exemplary embodiments of the present disclosure, the damper pulley assembly for a vehicle may have one or more of the following effects.

First, according to the present disclosure, the damper pulley assembly for a vehicle may reduce the friction coefficient by applying the anti-abrasion coating to the portion in contact with the hub. Second, according to the present disclosure, the damper pulley assembly for a vehicle may prevent the friction abrasion between the oil seal and the hub, and may thereby prevent an oil leak and reduce the weight of the rotational component.

However, effects of the present disclosure are not limited to the effects described above, and other effects that are not described above may be clearly understood by those skilled in the art from the claims.

Hereinabove, although the present disclosure has been described with reference to exemplary embodiments and the accompanying drawings, the present disclosure is not limited to the disclosed embodiments. On the contrary, it is intended to cover, various modifications and equivalents arrangements by those skilled in the art to which the present disclosure pertains without departing from the spirit and scope of the present disclosure claimed in the following claims.

What is claimed is:

1. A damper pulley assembly for a vehicle, comprising:
   a crank shaft of an engine of the vehicle;
   a hub coupled to the crank shaft to be rotated;
   a pulley coupled to an exterior surface of the hub and configured to rotate integrally with the hub; and
   an oil seal disposed between the hub and an interior of a cylinder block to prevent engine oil from being leaked in the cylinder block,
   wherein the hub has an abrasion prevention component formed on an exterior circumference surface on which the oil seal is disposed, and the abrasion prevention component prevents a separation of the oil seal.

2. The damper pulley assembly according to claim 1, wherein the hub includes:
   a hub body having a perforated center to which the crank shaft is insertedly coupled; and
   a hub ring protrudedly formed on an exterior surface of the hub body,
   wherein the abrasion prevention component is formed within the hub body.

3. The damper pulley assembly according to claim 2, wherein the oil seal is disposed between the hub body and the interior of the cylinder block.

4. The damper pulley assembly according to claim 1, wherein the abrasion prevention component includes a coating component formed by performing an anti-abrasion coating for an exterior circumference surface of the hub body.

5. The damper pulley assembly according to claim 4, wherein the abrasion prevention component has a depression formed in the exterior circumference surface of the hub body, and the coating component is formed on the depression.

6. The damper pulley assembly according to claim 5, wherein the size of the abrasion prevention component is formed to be greater than a contact surface that the oil seal is in contact with the abrasion prevention component.

7. The damper pulley assembly according to claim 4, wherein the coating component is formed by an arc using a thermal spray, a plasma spray, or a laser cladding.

8. The damper pulley assembly according to claim 5, wherein the depression has grooves formed configured to prevent the coating component from being separated in a shaft direction of the hub body.

9. The damper pulley assembly according to claim 8, wherein a plurality of grooves are formed within the depression.

10. The damper pulley assembly according to claim 8, wherein the grooves are formed at a front and back of the depression in the shaft direction of the hub body.

11. The damper pulley assembly according to claim 5, wherein the depression size is formed to be less than an exterior diameter of the hub body, and the coating component is formed to be greater than the exterior diameter of the hub body.

12. The damper pulley assembly according to claim 10, wherein the coating component is ground or lapped to be equal to an exterior diameter of the exterior circumference surface of the hub body.

13. The damper pulley assembly according to claim 1, wherein the hub is formed of an aluminum or magnesium alloy material.

14. A damper pulley assembly for a vehicle, comprising:
a crank shaft configured to receive power generated from an interior of an engine to be rotated;
a hub having a hub body with a perforated center to which the crank shaft is insertedly coupled, and a hub ring protrudedly formed on an exterior surface of the hub body;
a pulley coupled to an exterior surface of the hub ring; and
an oil seal disposed between the hub body and an interior of a cylinder block that is configured to prevent a leak of engine oil within the cylinder block,
wherein the hub includes an abrasion prevention component in which a depression is formed in an exterior circumference surface of the hub body, and a coating component formed by performing an anti-abrasion coating is formed on the depression.

15. The damper pulley assembly according to claim 14, wherein the oil seal is disposed along an exterior circumference surface of the abrasion prevention component.

* * * * *